Aug. 2, 1949.   G. F. SIMPKINS   2,477,945
HAND GUIDED TRACTOR
Filed June 1, 1948   2 Sheets-Sheet 1
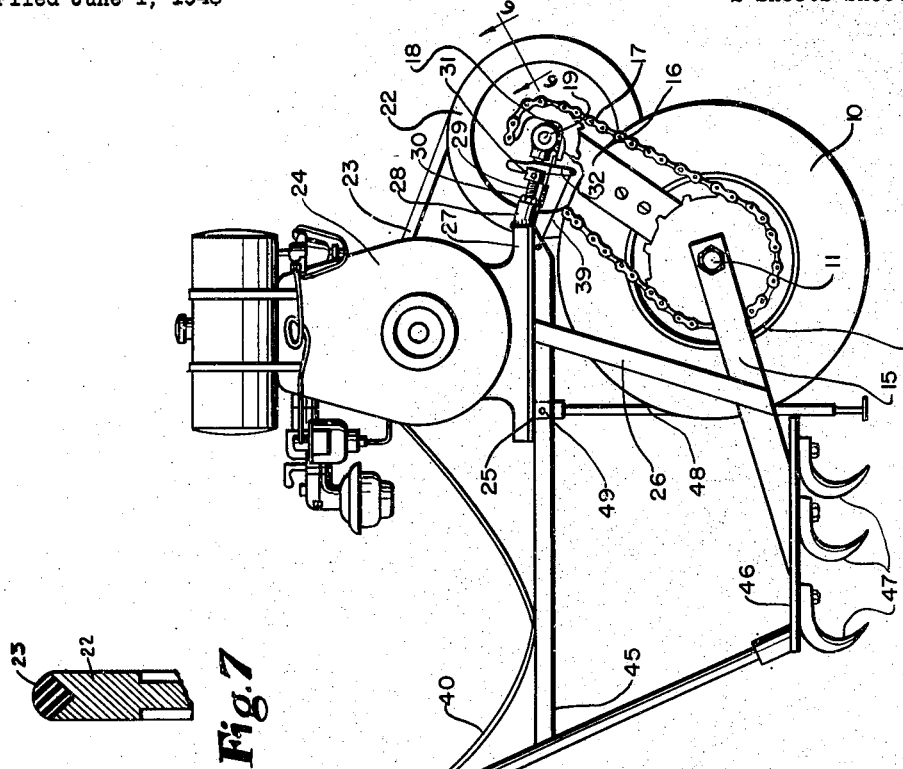
Fig 1
Fig. 7
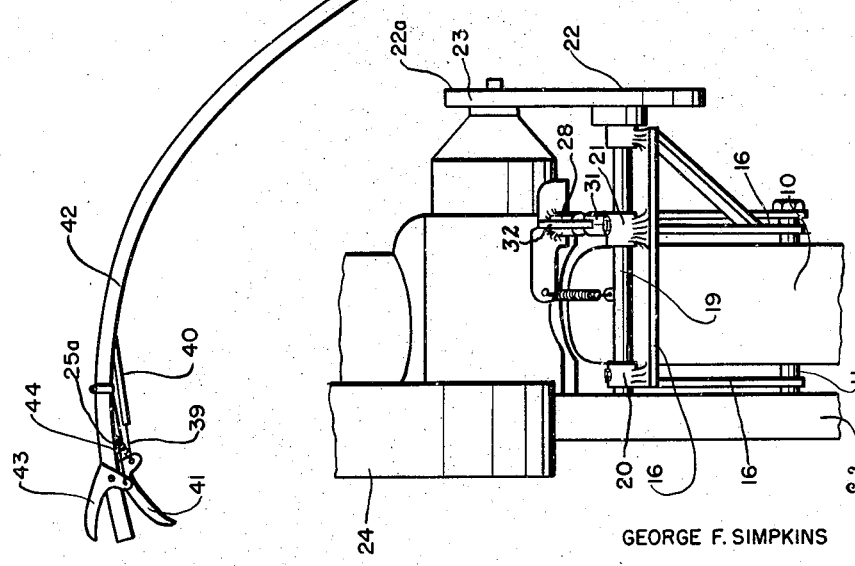
Fig 2
GEORGE F. SIMPKINS
Inventor
By Ben. J. Chromy
his Attorney Aug. 2, 1949.　　　G. F. SIMPKINS　　　2,477,945
HAND GUIDED TRACTOR
Filed June 1, 1948　　　2 Sheets-Sheet 2

Inventor
GEORGE F. SIMPKINS
By Ben. J. Chromy
his Attorney

Patented Aug. 2, 1949

2,477,945

UNITED STATES PATENT OFFICE 2,477,945

HAND GUIDED TRACTOR

George F. Simpkins, Bridgeton, N. J.

Application June 1, 1948, Serial No. 30,319

5 Claims. (Cl. 180—19)

This invention relates to hand garden and lawn tractors generally. More particularly, this invention relates to hand garden and lawn tractors having control means for quickly and easily starting and stopping the tractor.

An object of this invention is to provide a hand guided and engine driven agricultural implement in which the handle of the implement is provided with traction control means whereby the implement may be quickly and easily started or stopped.

Another object of this invention is to provide a hand guided and engine driven agricultural implement consisting of a tractor that may be provided with various garden or lawn working tools, said implement being provided with simple and reliable means for connecting or disconnecting the motor thereof from the implement handle.

Still another object of this invention is to provide a hand garden and lawn tractor in which power is transmitted from the engine by means of a V-belt, the slack in which is taken up by means of a simple cam that is manipulated from the handle of the tractor through a flexible cable so that power may be transmitted through said V-belt simply by adjusting the tension of the belt from the tractor handle through the aforesaid flexible cable.

Other and further objects of this invention will be apparent to those skilled in the art to which it relates from the following specification, claims and drawings.

Figure 3:
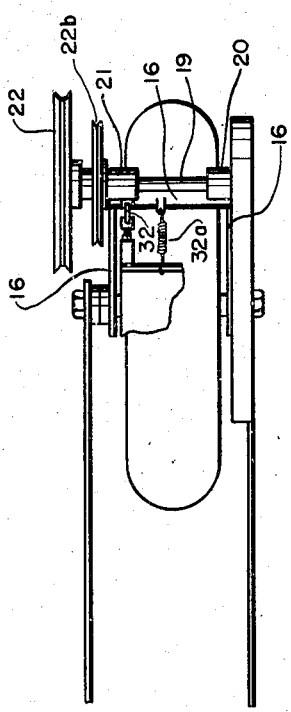
Figure 4:
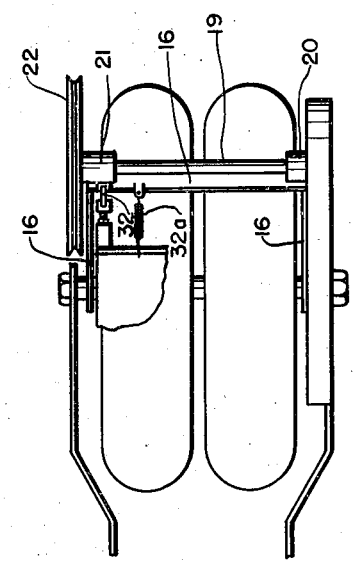
Figure 5:
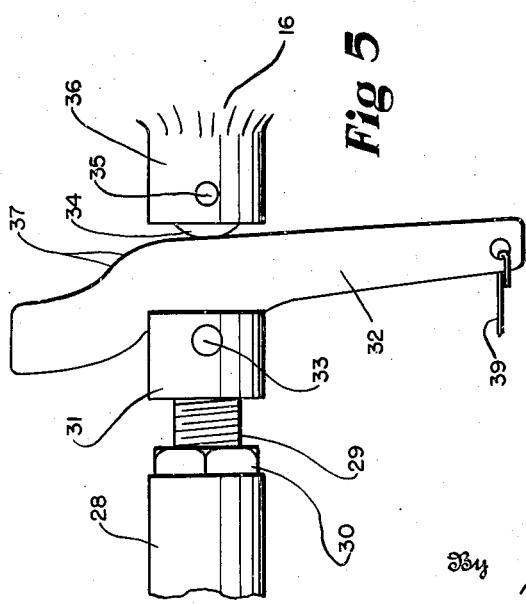
Figure 6:
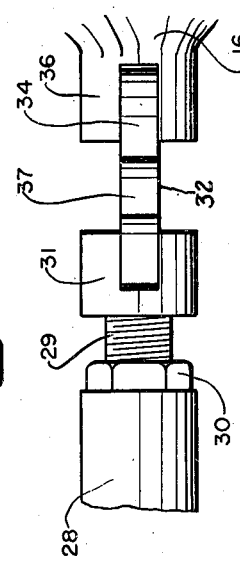

In the drawings, briefly, Figure 1 is a side view of the hand garden and lawn tractor in which the chain drive guard and chain drive sprocket have been partially cut away to show the V-belt tensioning cam; Figure 2 is a fragmentary front view of the tractor shown in Figure 1; Figure 3 is a fragmentary view of the top of the V-belt tensioning mechanism employed in this tractor; Figure 4 is a fragmentary top view of a modified form of tractor employing two traction wheels instead of one as shown in Figure 3; Figure 5 is a detailed view of the V-belt tensioning cam looking at the mechanism from the side; Figure 6 is a detailed view of the V-belt tensioning cam looking at the mechanism from the top; and Figure 7 is a fragmentary sectional view taken along the line 6—6 of Figure 1 to show a cross section of the V-belt and the pulley driven thereby.

Referring to the drawing in detail reference numeral 10 designates the tire and wheel assembly consisting of a pneumatic tire attached to a metal wheel in conventional manner. The metal wheel is fixed to the main drive axle 11 to which is also fixed the sprocket wheel 14. Suitable bearings are provided for the main drive axle 11 so that this axle may rotate in suitable holes provided in the frame 15 as will be described in detail hereinafter. These or supplementary bearings also pivotally support the ends of the frame member 16 on the axle 11.

The chain 17 engages the sprocket 14 and the sprocket 18, the sprocket 18 being of substantially less diameter than the sprocket 14. The sprocket 18 is fixed to the drive shaft 19 that rotates in the bearings 20 and 21 that are attached to the horizontal portion of the U-shaped frame 16 so that the sprocket and axle may be freely rotated in said bearings. The V-belt pulley 22 is also fixed to the drive shaft 19 and this pulley 22 is driven by the V-belt 23 that in turn is driven by a suitable pulley provided to the small gasoline engine 24 or other suitable motor.

The engine 24 is attached to a table 25 that is supported on the frame 15 by supports including the members 26, the ends of which are welded in place. Welded to the front end of the engine base 27 is a threaded sleeve 28 in which is positioned a threaded adjusting stud 29 that is provided with a lock nut 30. The head 31 of the adjusting stud 29 is recessed and the hardened steel cam 32 is pivoted in this recess by means of the cam pin 33. Cooperating with the hardened steel cam 32 is a hardened steel roller 34 that is supported by means of the roller pin 35 in a suitable recess in the roller bracket 36 that is attached to the horizontal member of the U-shaped frame 16 or to the bearing 21.

The cam 32 is provided with a curved surface 37 cooperating with the roller 34 to apply manually controllable amounts of tension to the V-belt 23 as will be described hereinafter. The lower end of the cam 32 is provided with an aperture to which is attached one end of the cable 39. The other end of this cable 39 is attached to the handle 41 that is pivoted near the upper end of the tractor handle 42 so that the cam 32 may be manipulated by the operator controlling the tractor. The lever 41 is biased in its vertical position by the spring 25a. The cable 39 consists of a flexible wire passing through a sheath 40 that is attached to the tractor frame at convenient points and functions to guide the wire 39. The cable 39 and the handle 41 for manipulating this cable may be positioned on the left hand control bar of the tractor as desired and on the right hand control bar of the tractor may be positioned the handle 43 that is connected to the cable 44 for controlling the tractor engine 24.

The control bars 42 may be welded to suitable bracing members 45 and to the tractor implement plate 46 to which are attached the various implements such as the earth working points 47. A stand 48 that is pivotly attached by means of the bolt 49 to the bottom of the engine base plate is provided for the purpose of supporting the tractor in upright position when the tractor is at rest and this stand 48 may be swung up against the horizontal member 45.

The operation of the lawn and garden tractor is as follows: On the left hand one of the control bars 42 on the operators end thereof there is attached a curved and hinged handle 41 which when not in use is held in a vertical position by a spring. The operator, to engage the engine 24 to the wheel 10 and thereby cause the tractor to move forward moves the handle 41 to a horizontal position. The handle 19 is slightly concave and thereby fits onto the handle bar. The pressure needed for this operation is so slight that the operator is not aware of any strain or pull on his fingers or hands. To stop the tractor the operator has but to relax the grip, releasing the pressure. The spring 25a pulls the handle down thereby releasing the tension on the wire 39 and causing the cam 32 to release the tension on the belt 23 so that the engine 24 becomes disconnected from the wheel 10 and runs freely.

As pointed out above the pressure required to manipulate the handle 41 is small so as to reduce any fatigue that might be produced in the fingers or hands of the operator. Furthermore because of this small pressure required and because of the construction of the cam 32 and the roller 34 the tension on the V-belt 23 may be so uniformly and smoothly controlled that a high degree of maneuverability of the tractor is obtained because the tractor may be operated at practically any speed from a very slow walk to its maximum speed in smooth continuously variable manner. This will be more fully apparent from the following paragraphs of this specification dealing with the operation of this tractor.

One end of a wire 39, which is encased in a suitable housing 40 so as to facilitate its movement along the course chosen for it, is attached to the spring biased handle 41 and the other end of the wire is fastened to the clutch cam 32. The compression of the handle 41 pulls the wire through the housing 40 causing the hinged cam 32 to move in the direction of the operator on its lower end and so creating a pressure on the upper end, as shown in Fig. 5, away from the operator, inasmuch as the cam 32 is hinged by the pin 33 and is fastened to the motor frame 27. An adjustment for wear is provided in the mechanism by the threaded adjusting stud 29 and locking nut 30. The upper part of the cam 32 being in contact with a hardened roller 34 pushes it away when pressure is applied on it by the movement of the cam 32. A constant pressure to keep the roller 34 in contact with the cam 32 is provided by a spring 32a.

The roller 34 is securely fastened to the fork 16 so that when pressure is applied by the action of the cam 32 it causes the fork 16 to move away a given distance, which distance is controlled by the shape of the cam 32. The fork 16 to which are attached the necessary bearings 20 and 21 to carry the shaft 19 has for a pivot two bearings one on each leg thereof through which runs the main drive axle 11. The pulleys 22 and 22a engage the V belt 23 which belt, when loose on these pulleys will not cause the V belt to transmit power from pulley 22a to the pulley 22 but when the belt 23 is drawn tight by the action of the cam 32 and roller 34 power is transmitted to the traction wheel 10.

The driven pulley 22 is securely fastened to the shaft 19 and causes the shaft 19 to turn thus transmitting the power through the shaft to sprocket 18 that in turn transfers the energy to a roller chain 17 which provides the power needed to turn the traction wheel 10. The shaft 11 has securely fastened on the driving end a sprocket 14, which is turned by the action of the roller chain 17 and thus transmits power to the traction wheel 10 through an axle 11. The sprocket 14 and traction wheel 10 are keyed to axle 11.

The frame 15 has one or two adjustable legs 48 which can be used to hold the tractor upright when changing implements 47. The implements 47 are bolted fast to a plate 46 which is provided with slots to permit adjustment of these implements. The plate 46 is a part of the frame 15 inasmuch as it is welded fast thereto.

The positioning of the engine 24 with its center a slight distance to the rear of the axle 11 and somewhat ahead of the implements 47 results in a tractor in which the weight is so distributed that the implements 47 need not be urged into the ground by the operator. Furthermore this arrangement causes the tractor to develop a considerable traction so that the power thereof is efficiently utilized.

A lawn mower or sickle bar can be attached to the tractor with use of a fork 16 similar to the one used to carry shaft 19 and power may be supplied thereto by the auxiliary pulley 22b shown in Fig. 3 which can be used as a power take off to supply power to various portable units. Various desired speeds can be attained with the tractor simply by using the throttle control 43 placed on the side of one of the control bars 42 and connected to the engine by a cased wire.

While I have described and illustrated this invention in detail with respect to an embodiment thereof it is of course to be understood that I do not desire to limit the invention to those details except insofar as they are defined by the claims.

What I claim is:

1. A highly maneuverable hand guided tractor comprising an engine, a tractor wheel, an axle for said tractor wheel, a rocker arm pivoted at its lower end on said axle, a second axle supported at the upper end of said rocker arm, a V-pulley for said engine, a second V-pulley attached to said second axle, a V-belt between said V-pulleys, means for transmitting power from said second axle to said tractor wheel, means between said second axle and the base of said engine for causing said engine to transmit variable amounts of power to said second axle in a smooth and gradually controllable manner, said last mentioned means comprising a cam shaped manually controllable member attached to said engine base and a roller member attached to the upper end of said rocker arm and engaging the cam surface of said cam shaped member whereby a gradually and progressingly increasing tension may be applied to said V-belt by manual manipulation of said cam shaped member so that power can be transmitted from said engine to said tractor wheel in such smoothly controllable manner that the speed of the tractor may be gradually changed from a slow walk to its maximum speed.

2. A highly maneuverable hand guided tractor comprising an engine, a tractor wheel, an axle for said tractor wheel, a rocker arm pivoted at its lower end on said axle, a second axle supported at the upper end of said rocker arm, a V-pulley for said engine, a second V-pulley attached to said second axle, a V-belt between said V-pulleys, means for transmitting power from said second axle to said tractor wheel, means between said second axle and the base of said engine for causing said engine to transmit variable amounts of power to said second axle in a smooth and gradually controllable manner, said last mentioned means comprising a cam shaped manually controllable member attached to said engine base and a roller member attached to the upper end of said rocker arm and engaging the cam surface of said cam shaped member, a manually operable cable attached to said cam for moving the surface of said cam with respect to said roller for gradually and progressively increasing the tension of said V-belt so that power can be transmitted from said engine to said tractor wheel in such smoothly controllable manner that the speed of the tractor may be gradually changed from a slow walk to its maximum speed.

3. A highly maneuverable hand guided tractor comprising an engine, a tractor wheel, an axle for said tractor wheel, a rocker frame pivoted at its lower end on said axle on each side of said wheel, a second axle supported at the upper end of said rocker arm, a V-pulley for said engine, a second V-pulley attached to said second axle, a V-belt between said V-pulleys, means for transmitting power from said second axle to said tractor wheel, means disposed between the base of said engine and a point substantially midway of said second axle for controlling the tension of said V-belt and for causing said engine to transmit variable amounts of power to said second axle in a smooth and gradually controllable manner, said last mentioned means comprising a cam shaped manually controllable member attached to said engine base and a roller member attached to the upper end of said rocker arm and engaging the cam surface of said cam shaped member whereby a gradually and progressively increasing tension may be applied to said V-belt by manual manipulation or said cam shaped member so that power can be transmitted from said engine to said tractor wheel in such smoothly controllable manner that the speed of the tractor may be gradually changed from a slow walk to its maximum speed.

4. A highly maneuverable hand guided tractor comprising an engine, a tractor wheel, an axle for said tractor wheel journaled below said engine and slightly to the front of said engine, a rocker arm pivoted at its lower end on said axle and adapted to swing toward the front of said tractor wheel, a second axle supported at the upper end of said rocker arm, said second axle being disposed approximately in line with the base of said engine, a V-pulley for said engine, a second V-pulley attached to said second axle, a V-belt between said V-pulleys, means for transmitting power from said second axle to said tractor wheel, means between said second axle and the base of said engine for causing said engine to transmit variable amounts of power to said second axle in a smooth and gradually controllable manner, said last mentioned means comprising a cam shaped manually controllable member attached to said engine base and a roller member attached to the upper end of said rocker arm and engaging the cam surface of said cam shaped member whereby a gradually and progressingly increasing tension may be applied to said V-belt by manual manipulation of said cam shaped member so that power can be transmitted from said engine to said tractor wheel in such smoothly controllable manner that the speed of the tractor may be gradually changed from a slow walk to its maximum speed.

5. A highly maneuverable hand guided tractor comprising an engine, a tractor wheel, a frame, an axle for said tractor wheel journaled in said frame below said engine and slightly to the front of said engine, earth working implements attached to said frame in such relation that the center of said engine is disposed between said earth working implements and said axle, a rocker arm pivoted at its lower end on said axle and adapted to swing toward the front of said wheel, a second axle supported at the upper end of said rocker arm, a V-pulley for said engine, a second V-pulley attached to said second axle, a V-belt between said V-pulleys, means for transmitting power from said second axle to said tractor wheel, manually movable cam means between said second axle and the base of said engine for pushing said second axle toward the front of said tractor wheel to increase the tension of said V-belt, and hand gripping means attached to the rear of said frame for maneuvering the tractor, said tractor wheel, said engine and said earth working implements being so disposed that the extent to which the soil is worked is readily controlled by the tractor operator.

GEORGE F. SIMPKINS.

REFERENCES CITED

The following references are of record in the file of this patent:

UNITED STATES PATENTS

| Number | Name | Date |
|---|---|---|
| 1,370,538 | Hogg | Mar. 8, 1921 |
| 1,437,667 | McCarthy, Jr. | Dec. 5, 1922 |
| 2,069,245 | Haines | Feb. 2, 1937 |
| 2,292,580 | Moyer et al. | Aug. 11, 1942 |

FOREIGN PATENTS

| Number | Country | Date |
|---|---|---|
| 405,641 | Great Britain | Feb. 6, 1934 |